Sept. 9, 1969     W. N. WEIHMULLER     3,466,095
BLOWER TYPE MATERIAL FEEDER
Filed Feb. 1, 1968     4 Sheets-Sheet 1
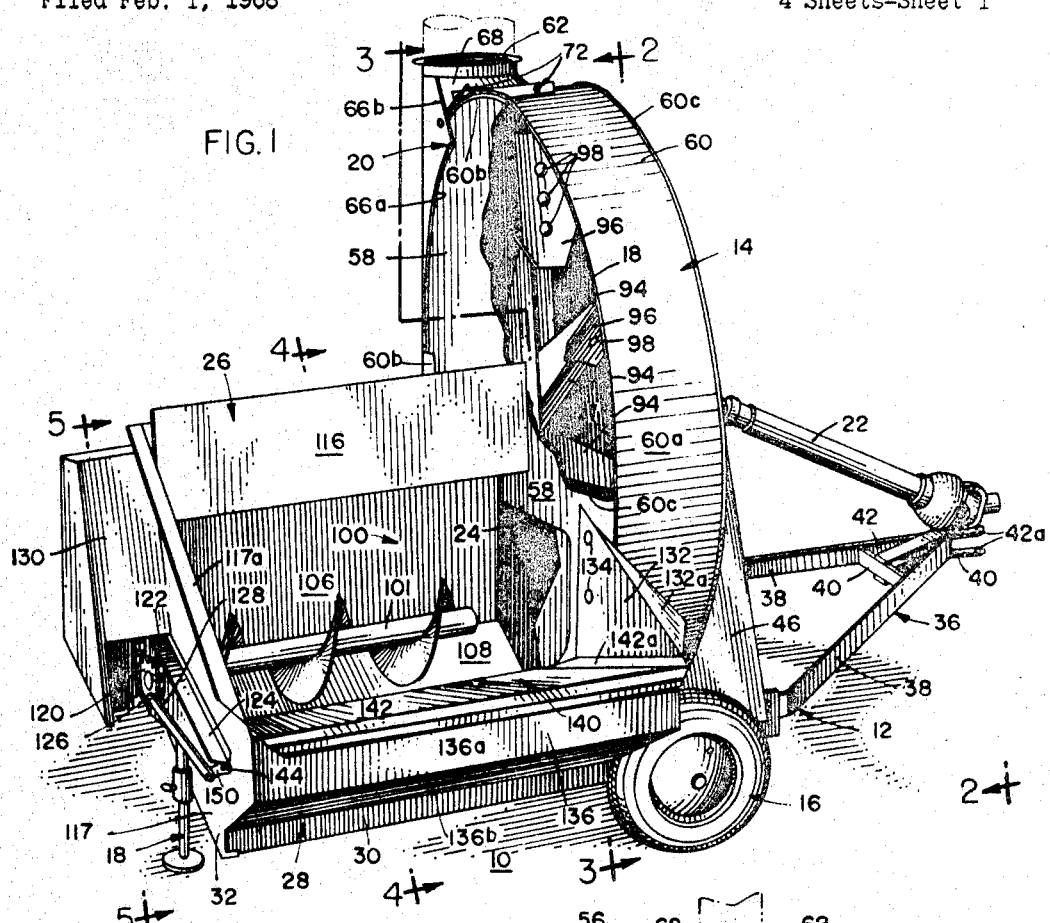
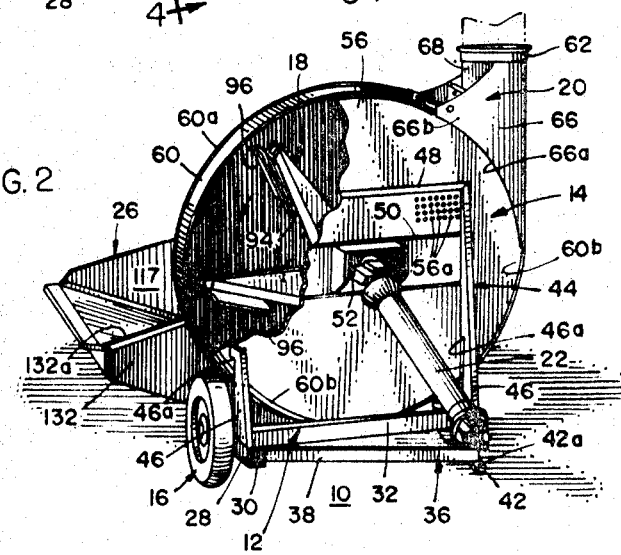
INVENTOR:
WALTER N. WEIHMULLER
BY
ATT'YS

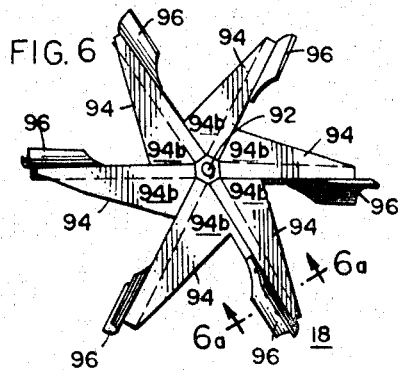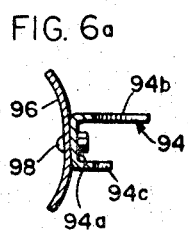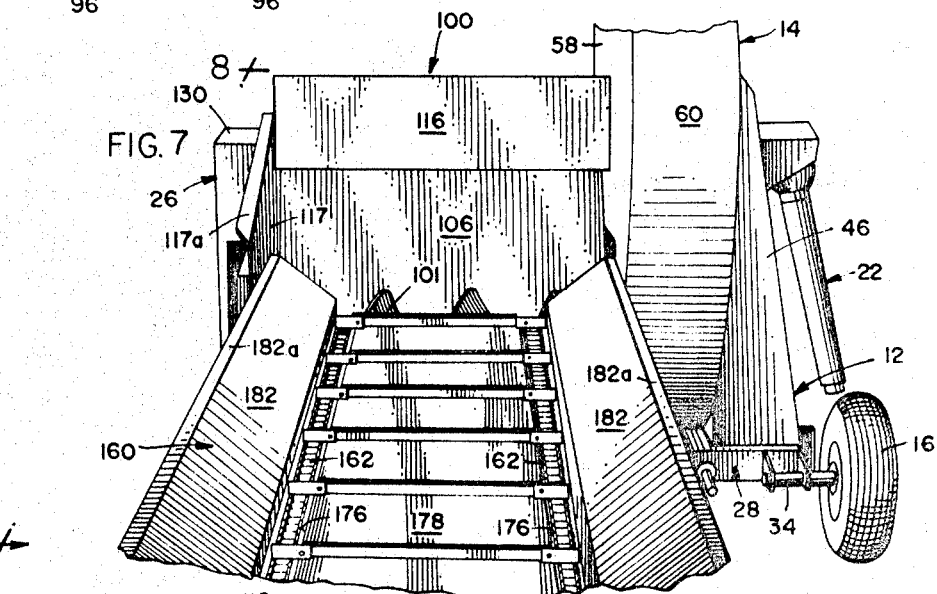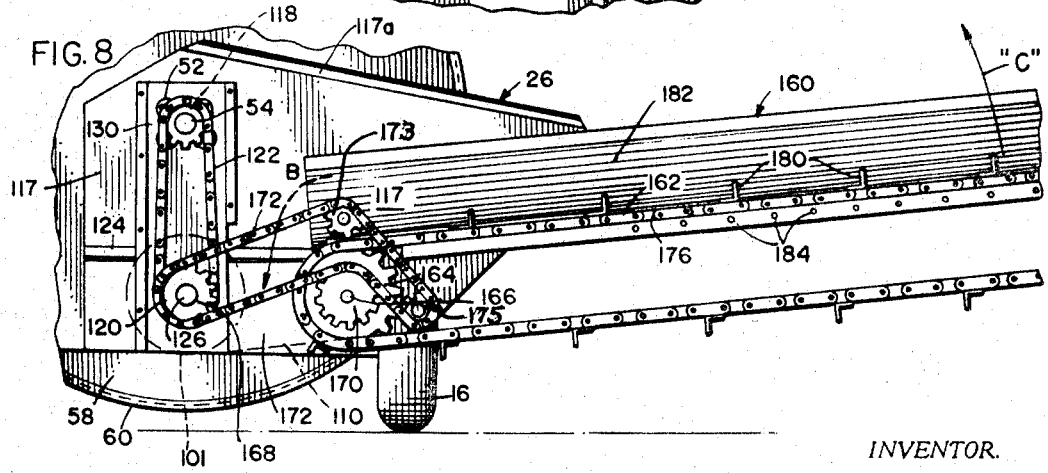

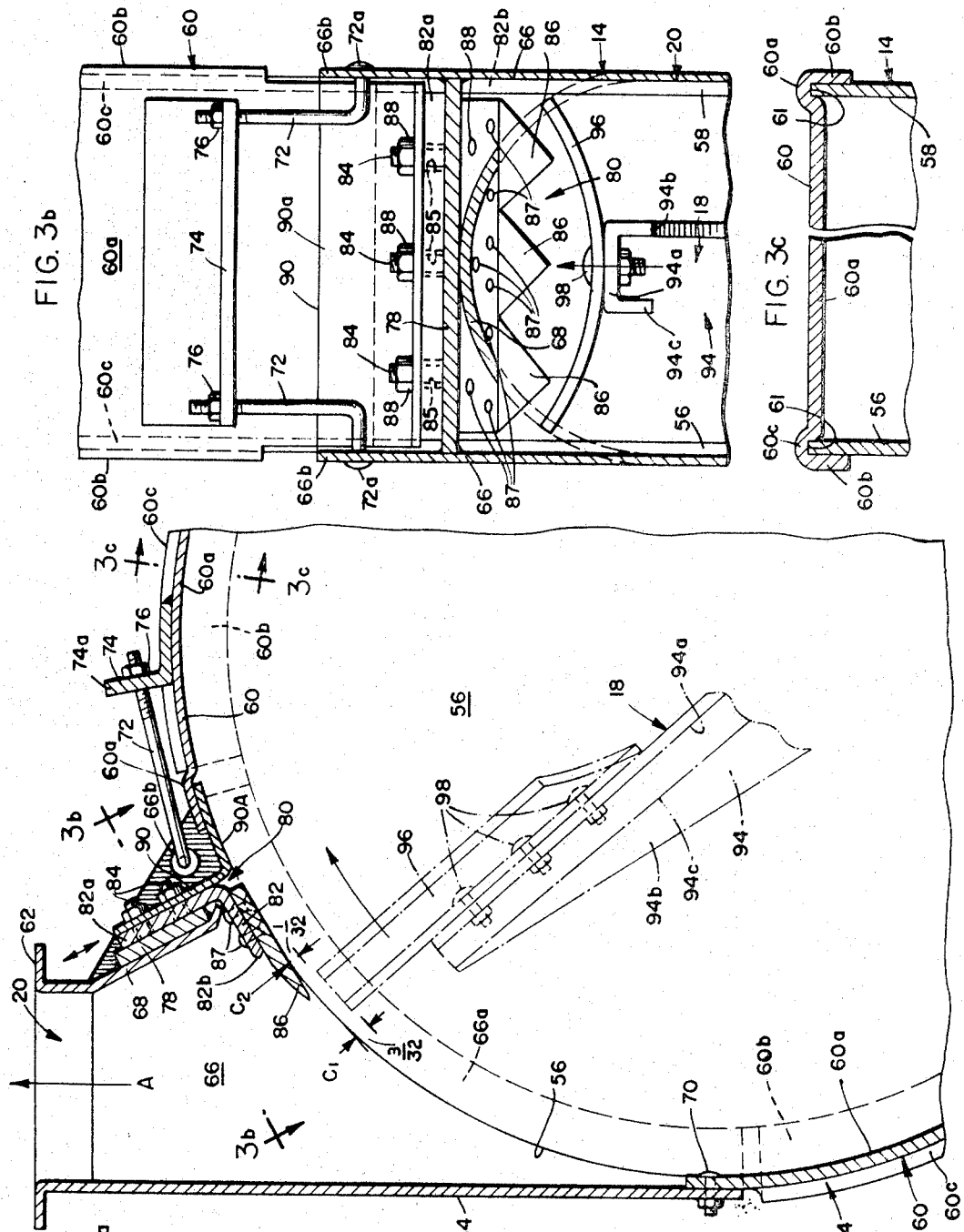

INVENTOR:
WALTER N. WEIHMULLER

United States Patent Office 3,466,095
Patented Sept. 9, 1969

3,466,095
BLOWER TYPE MATERIAL FEEDER
Walter N. Weihmuller, Kaukauna, Wis., assignor to De Muth Steel Products Company, Schiller Park, Ill., a corporation of Illinois
Filed Feb. 1, 1968, Ser. No. 702,464
Int. Cl. B65g 53/46, 53/48
U.S. Cl. 302—37                                    4 Claims

ABSTRACT OF THE DISCLOSURE

A centrifugal blower for pneumatically conveying material, such as silage, grain, and the like, into silos, storage bins, etc., comprising a blower housing having parallel sidewalls with an inlet formed on one of said sidewalls and tangentially directed outlet means between said sidewalls. A rotor assembly is mounted for rotation in the housing for moving the material entering through the inlet and discharging it through the outlet means at high velocity generally tangential to the path of the rotor. The rotor assembly includes a hub journaled for rotation and extending transversely between the sidewalls with a plurality of radial spokes projecting outwardly of the hub. A rotor blade is removably mounted adjacent the outer end of each spoke, and each rotor blade has a concavely curved, advancing face with longitudinal side edges thereof spaced in advance of the central portion of the blade in the direction of rotation.

---

The present invention relates to a new and improved centrifugal blower for the pneumatic conveyance of material, such as silage, grain, and the like, into silos, storage bins, etc., and more particularly pertains to a blower of the character described having improved performance characteristics and adapted for heavy duty usage.

In prior blowers of the general character described, oftentimes when wet material, such as silage, is fed into the blower the silage, being stringy, tends to wrap around the blade of the rotor assembly, causing increased friction and eventually requiring shut-down of the unit so that the silage may be untangled and removed. This is a time consuming task and reduces the overall efficiency of operations in loading a silo.

It is an object of the present invention to provide a new and improved centrifugal blower of the character described.

Yet another object of the present invention is to provide a new and improved centrifugal blower of the character described employing a new and unique rotor assembly which is capable of handling wet, stringy material with a minimum of material collection and entwinement around the rotor blades and spokes.

Yet another object of the present invention is to provide a new and improved blower of the character described having a new and improved rotor assembly therein which is extremely strong and is capable of handling diverse types of material on a continuous high flow-rate basis, even though the material may be extremely wet, stringy, and hard to handle.

Another object of the present invention is to provide a new and improved centrifugal blower having means permitting the easy adjustment of the direction of the outlet discharge to provide a plurality of different angular relations with respect to the horizontal.

Still another object of the present invention is the provision of a new and improved blower of the character described having an improved rotor assembly wherein the individual rotor blades are curved in a manner so that the material is directed toward the central portion of the blades and away from the outer edges adjacent the blower housing walls, thereby reducing the stress on the blades, centering the load on the rotor assembly and, consequently, reducing bearing load and blower assembly failures.

Still another of the present invention is the provision of a new and improved blower of the character described including means for introducing a small auxiliary flow of air into the housing to provide for smoother running of the rotor within the blower housing and a reduction in the horsepower required.

Still another object of the present invention is the provision of a centrifugal blower of the character described including a new and improved adjustable shear knife assembly which reduces or eliminates the problem of material collection in the throat adjacent the outlet fitting.

These and other objects of the present invention are accomplished in one embodiment thereof by a new and improved centrifugal blower comprising a blower housing having a pair of parallel sidewalls with an inlet formed on one of the sidewalls and a tangentially directed outlet means between the sidewalls. A rotor assembly is mounted for rotation in the housing on an axle extending transversely between the sidewalls, and the rotor is adapted to discharge material delivered into the housing through the inlet thereof at high velocity through the outlet means which can be set in a plurality of different angular directions with respect to the ground as required. The rotor assembly is of unique construction and includes a plurality of radial spokes, each spoke having a rotor blade removably secured adjacent the outer end thereof. The blades have concavely curved advancing faces and the opposite longitudinal edges of the blades are spaced in advance of the central portion of the blade in the direction of rotation. The material being handled is directed towards the central portion of the blade and binding or wrapping of the material around the edges of the blade adjacent the sidewalls of the blower housing is reduced. The blower also includes a new and unique adjustable shear knife assembly which is located adjacent the throat of the outlet means and prevents or reduces clogging or collecting of material in this area.

For a better understanding of the present invention reference should be had to the following detailed description taken in conjunction with the drawings, in which:

FIG. 1 is a perspective view of the new and improved blower constructed in accordance with the features of the present invention, with portions of the blower housing cut away to show the interior arrangement of components therein;

FIG. 2 is a perspective view of an opposite side of the blower of the present invention, also with portions cut away, to show the interior components thereof;

FIG. 3a is an enlarged blow-up shown in section and illustrating an area adjacent the throat of the discharge outlet wherein is mounted a new and improved shear knife assembly of the present invention;

FIG. 3b is a cross-sectional view taken substantially along line 3b of FIG. 3a;

FIG. 3c is a fragmentary cross-sectional view taken substantially along line 3c of FIG. 3a and illustrating the construction of the blower housing;

FIG. 6 is a perspective view of a new and improved rotor assembly used in the blower of the present invention;

FIG. 6a is a cross-sectional view taken along the line 6a of FIG. 6, illustrating a rotor blade and spoke on which the blade is mounted;

FIG. 7 is a perspective view of another embodiment of a blower employing another embodiment of feed mechanism for delivering material to the inlet of the blower housing; and FIG. 8 is a side elevational view with portions broken away taken substantially along line 8—8 of FIG. 7.

Figure 3:
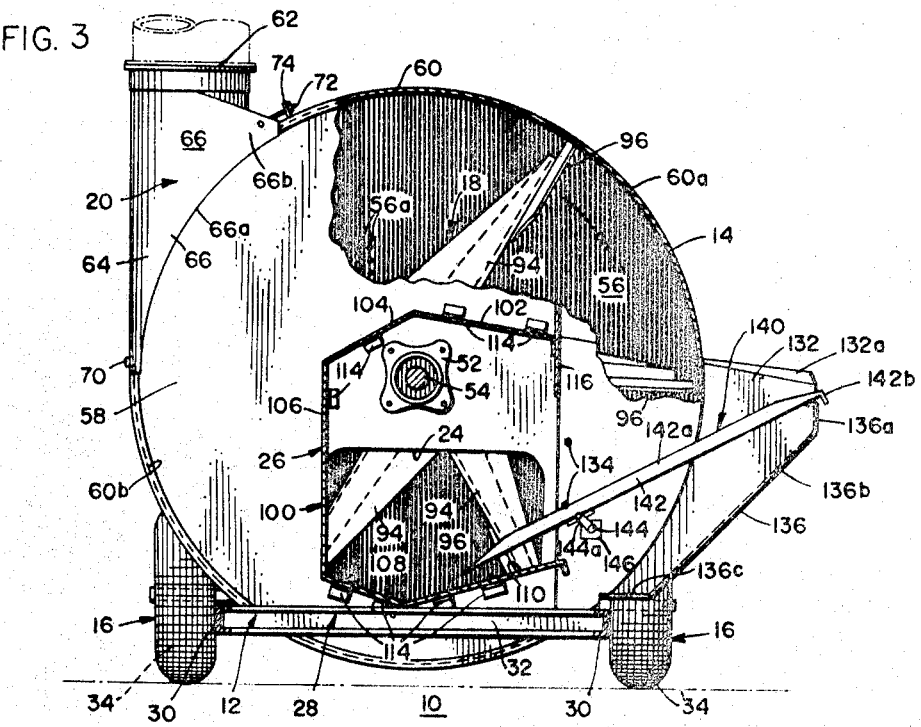
FIG. 3 is a sectional view of the blower assembly taken substantially along lines 3—3 of FIG. 1.

Referring now more specifically to the drawings, therein is illustrated a new and improved blower characterized by the features of the present invention and referred to generally by the reference numeral 10. The blower 10 is especially adapted for use in the pneumatic conveyance of forage material, such as silage, grain, etc., into silos, storage bins, and the like, and is commonly termed a silo filler. The unit includes a base structure 12 which supports a blower housing 14 and, because the unit 10 is adapted to be moved about to various job sites, a pair of wheels with pneumatic tires 16 thereon are mounted on the frame. A jack assembly 18 is provided to support the end of the unit opposite the wheels when the unit is set in position ready for operation.

A rotor assembly 18 (FIGS. 6 and 6a) is journaled for rotation within the blower housing 14 for moving the material delivered thereto and discharging it at high velocity through an outlet fitting 20 which is connected to a delivery pipe or duct (not shown). The rotor is driven by a drive shaft assembly 22 which is adapted to be connected with the power take-off of an external power source, such as a tractor or the like. One sidewall of the blower housing 14 is provided with a large inlet opening 24 (FIGS. 1, 3, and 4) in order to receive material from a feed assembly 26 drivingly interconnected with the rotor shaft. The material which is to be delivered to a silo, storage bin, or the like, is dumped or forked from a harvest truck or wagon into the feeder assembly 26 and is fed into the blower housing 14 through the inlet 24. The rotor assembly 18 discharges the material from the housing at high velocity via the outlet fitting 20 which is connected to a suitable delivery pipe or tube projecting into the silo or storage bin.

The support frame 12 is preferably fabricated by welding and includes a horizontal, base framework 28 (FIGS. 1, 2, 3, 4, and 5) comprising a pair of spaced apart side channels 30 interconnected by a plurality of cross members 32. The side channels 30 provide support for a pair of outwardly extending axles or spindles 34 adjacent the power end or forward end of the unit and the wheels and tires 16 are journaled on these axles. The jack assembly 18 is mounted on the cross channel 32 at the rear end of the framework so that the jack assembly and wheels provide a good, stable support means for supporting the blower unit during operation.

In order that the blower 10 may be easily towed from place to place, a tongue assembly 36 (FIGS. 1 and 2) is provided at the forward end of the base framework 28 so that a tractor or other vehicle can be hitched up for pulling the blower unit around like a trailer. The tongue assembly includes a pair of forwardly extending members 38 projecting forwardly of the side channels 30 and tapered inwardly to join in an apex on the longitudinal center axis of the framework. The members 38 are preferably joined by welding at their outer ends, and additional strengthening adjacent the junction or apex is provided by a transverse gusset or cross member 40 (FIG. 1). A pair of vertically spaced hitch members 42 are welded at their rearward ends to the upper and lower edges of the gusset 40 and project forwardly of the junction of the members 38 to provide a recess for receiving the tow bar of a tractor or other vehicle. The projecting forward end portions of the hitch members 42 are provided with vertically aligned poles 42a adapted to receive a tow pin for connecting the hitch to the tractor tow bar in the usual manner.

The support frame 12 also includes an upstanding or veritcal framework 44 (FIG. 2) mounted adjacent the forward end of the base framework 28 for supporting the blower housing 14. The vertical framework 44 includes a pair of flanged, side members 46 secured at their lower ends to the side channels 30 and an upper cross member 48 is provided to tie the upper ends of the side members together structurally. Spaced below the upper cross member 48 is provided a bearing support channel 50 having a broad web portion for supporting one of the flange bearings 52 which supports the main rotor shaft 54 (FIGS. 3 and 4) carrying the rotor assembly 18.

The blower housing 14 comprises a pair of parallel, spaced apart, circular sidewalls 56 and 58 and an annular band 60 of sheet metal extending between the sidewalls around the major portion of their peripheries. The band 60 is rolled from sheet metal and is generally channel shaped in cross section (FIG. 3c) including a relatively wide web portion 60a and a pair of relatively small, rolled side flanges 60b. As shown in FIG. 3c, immediately inwardly of and adjacent the side flanges 60b, the web portion 60a is formed with outwardly extending ridge portions 60c which define a pair of grooves 61 for receiving the outer peripheral edge portions of the circular sidewalls 56 and 58.

The forward or front end of the sidewall 56 is supported by the upstanding support framework 44 and is fixedly mounted in place by a plurality of bolts which project through suitably located holes provided in the sidewall and the cross members 48 and 50. As best shown in FIG. 2, the upper portions of the flanges on the vertical supports 46 bear against the outer face of the circular sidewall 56 and the lower portions of the supports 46 are recessed as at 46a in order to accommodate the flanged edge 60b of the and member 60 and permit the band to be rotatively adjusted on the fixed sidewall for angular adjustment of the discharge of material from the discharge outlet fitting 20. It should also be noted that the band 60 is spaced upwardly above, and clears the side channels 30, of the base support framework 28 so that the band can move freely around the blower sidewalls during adjustments without interference with the supporting frame 12.

The band 60 extends around the major portion of the circumference of the parallel, circular sidewalls 56 and 58 except for the area occupied by the outlet fitting or discharge boot 20. The discharge boot is adapted to direct the discharge of material from within the blower housing tangentially outward from the circular path traversed by the tips of the rotor blades of the rotor assembly 18, and the outlet end is formed with an annular flange 62 of rolled angle iron adapted to be connected with sections of round pipe for delivering material into the silo or storage bin being filled.

Referring specifically to FIGS. 3, 3a, and 3b, the discharge boot 20 includes an outer sidewall portion 64 tangent to the peripheral edge of the circular sidewalls 56 and 58, and a pair of sidewalls 66 having arcuately curved lower edge portions 66a (FIG. 3) adapted to overlie a segment of the peripheral edge of the respective sidewalls 56 and 58. The outlet fitting 20 also includes a wall section 68 (FIG. 3a) which lies in a plane extending generally radially outward of the circular sidewalls 56 and 58. The wall portions 64, 66, and 68 of the discharge boot 20 are preferably fabricated from a single piece of sheet metal which is formed to transition into the annular flange angle 62 at the outlet end. As best shown in FIG. 3a, the lower end portion of the outer sidewall 64 is connected to one end of the band 60 by bolts 70, and the opposite end of the band is interconnected with triangular gusset portions 66b of sidewalls 66 on the outlet fitting 20 by means of a pair of L-shaped bolts 72. To this end, an angle bracket 74 is welded or otherwise secured to the band web 60a and the upstanding flange 74a thereof is formed with a pair of spaced apart holes to receive threaded end portions on the longer legs of the respective L-bolts 72. Each L-bolt includes a headed portion 72a at the outer end of its shorter leg which projects through a suitable opening in the sidewall portions 66b of the outlet fitting 20, as best shown in FIGS. 3a and 3b. Accordingly, when nuts 76 are tightened on the threaded portions of the bolts 72, tension is exerted on the web 60a of the band member 60 drawing the band member tight around the periphery of the circular sidewalls 66 and 68, thus forming an air-tight enclosure or housing for the blower assembly 18.

A short piece of flat bar stock 78 is mounted on the outer surface of the wall portion 68 of the outlet boot 20 in order to support an adjustable shear knife assembly, indicated generally by the numeral 80 (FIG. 3a). The knife assembly is adapted to shear off and chop up the material adjacent the throat of the discharge boot so that it will discharge tangentially outwardly through the outlet of the boot in the direction indicated by the arrow A. The shear knife assembly 80 includes an angle support member 82 having an upwardly extending flange 82a adapted to bear against the outer surface of the support bar 78. Several spaced apart, threaded studs 84 are welded to the outer surface of the support bar 78, and the studs are adapted to support and hold the angle 82 firmly in place when nuts 88 are tightened thereon. Each stud projects through an appropriately located vertical slot 85 formed in the flange 82a of the angle bracket and, accordingly, the angle bracket 82 is adjustable toward and away from the axis of rotation of the rotor assembly 18 mounted in the blower housing 14. The support angle 82 includes a flange 82b (FIG. 3a) in a plane generally tangent to the path of rotation of the rotor assembly and this flange supports a plurality of replaceable, sickle-type, cutter members 86 riveted to the flange by flush head rivets 87. The cutters 86 have triangular shaped, outer cutting edges (FIG. 3b) formed of hardened steel and serve to spear and chop the material moving into contact therewith so that it is free to discharge through the outlet of the discharge boot 20. Clearance between the lower face of the cutters 86 and the outer end of the rotor blades is easily adjusted by loosening the nuts 88 and moving the support angle 82 up or down on the supporting bar 78. For this purpose, the vertical slots 85 accommodate limited movement of the angle, and when nuts 88 are tightened on the studs 84 the cutter assembly is firmly held in place. In practice, the lower surfaces of the cutters 86 are set so that they clear the outer tip of the rotor blades (as indicated by the letter C–1 in FIG. 3a) by an amount in the order of $\frac{3}{32}$ inch, and as the cutters 86 begin to wear, this clearance can be maintained by adjustment as described.

Should one of the cutters 86 become dull or broken, it can be replaced by removing the angle 82 from the support bar 78 and bodily removing the shear knife assembly 80 from the blower housing whereupon the damaged or worn cutter can be easily removed and replaced.

In order to prevent air leakage from the blower housing in the vicinity of the shear knife assembly 80, a cover angle 90 is spot welded or otherwise attached to the outer surface of the angle flange 82a. The cover angle 90 is preferably formed of light sheet metal and includes a lower leg portion 90a adapted to underline the end portion of the band web 60a (best shown in FIG. 3a) and seal the space between the end of the band and the angle 82.

As before indicated, the angle of discharge of material from the blower (represented by the arrow A in FIG. 3) is adjustable, and adjustment is accomplished by loosening the nuts 76 on the bolts 72 so that the tension on the band 60 is released. The band 60 and outlet housing 20 can then be moved around the circular sidewalls 56 and 58 to provide any desired angle of discharge. The band and discharge boot can be bodily removed if desired, exposing the inside surface of the sidewalls 56 and 58 and the rotor assembly 18 for cleaning and removal of material collected on these components.

The rotor assembly 18 is keyed to the main rotor shaft 54 and is mounted for rotation in the blower housing 14 to receive material fed into the housing through the inlet opening 24 on the sidewall 58 and discharge the material at high velocity tangentially of the band member 60 through the discharge boot 20. The rotor shaft 54 is supported by a plurality of flange bearings 52, a pair of which are bolted to the outside surface of the respective circular sidewalls 56 and 58 and a third flange bearing (FIG. 5), which is mounted on the outer end wall of the feeder mechanism 26.

The rotor assembly is best illustrated in FIGS. 6 and 6a and includes a hollow hub 92 having a hexagonal cross section and a plurality of radially extending spokes 94 extending outwardly of the flat external faces of the hub. The spokes 94 are of channel shaped cross section (FIG. 6a), each including a web portion 94a, and a pair of flanges 94b and 94c. In accordance with the invention the flanges 94c which face the circular sidewall 58 are deeper at their root portion adjacent the hub 92 and taper to a minimum depth adjacent the tip of the spokes, while the flanges 94c adjacent the sidewall 56 may be of uniform depth from hub to tip. Because of the tapered construction of the flanges 94b, the rotor spokes are extremely strong, and deflection at the tip of the spokes caused by heavy loading of material is reduced. The increased depth of the flange 94b adjacent the inlet side 58 of the housing provides for maximum strength at the point of greatest load on the rotor as the material is being introduced into the housing through the inlet opening 24 and prevents the spokes from twisting because of the greater loading adjacent the inlet side of the housing.

Adjacent the outer end portion of each spoke 94 is provided a replaceable rotor blade 96 secured to the spoke by a plurality of bolts 98 (FIGS. 3a and 6a). Each blade 96 is formed with a concave advancing face so that material striking the blade is directed toward the center portion of the blade and away from the outside edges moving closely adjacent to the sidewalls 56 and 58. The curved blades are stronger than flat blades and aid in centering the load on the rotor assembly midway between the parallel sidewalls 56 and 58. Because of this, the chance of material becoming entwined around the edges of the rotor blades and dragging around the housing sidewalls is reduced, thereby reducing the drag on the rotor and the horsepower required. Because of the concave advancing faces of the rotor blade, the longitudinal side edges thereof are always ahead or in advance of the midportion of the blade which forms a center pocket for the material. The individual rotor blades are easily replaced, should they become worn or damaged, and spoke webs 94a are provided with appropriately spaced longitudinal slots for accommodating the bolts 98, so that balancing of the rotor assembly is easily accomplished by radial adjustment of the blades when mounted on the spokes.

Figure 4:
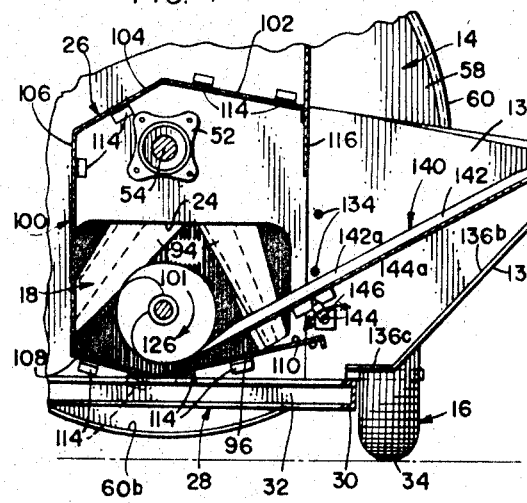
FIG. 4 is a fragmentary cross-sectional view illustrating a feeding mechanism for delivering material to the inlet of the blower housing.
Figure 5:
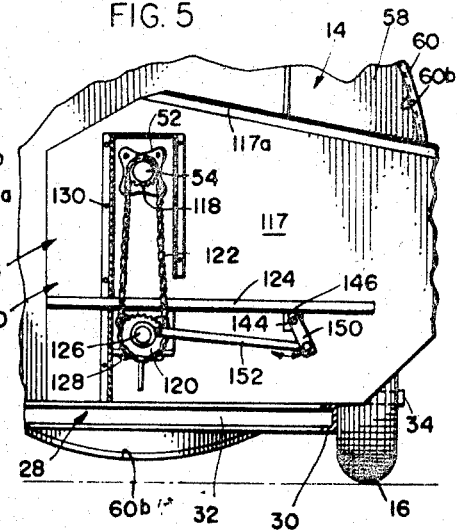
FIG. 5 is an end view showing the feeding mechanism and taken substantially along lines 5—5 of FIG. 1.

As best shown in FIGS. 1, 3, and 4, one end of the feeder mechanism 26 is in direct communication with the large inlet opening 24 on the sidewall 58 so that the forage can feed material easily into the blower housing 14. The feeder mechanism includes an enclosure or housing 100 fabricated of sheet metal which partially encloses a rotating auger 101 that is horizontally disposed and centrally positioned with respect to the inlet opening 24 (FIG. 4). The housing 100 includes a pair of sloping top walls 102 and 104, a back wall 106, and a pair of bottom walls 108 and 110 which form a V-bottom or trough for holding the material which is introduced into the feeder from the front or open side of the housing.

Preferably, the walls 102, 104, 106, 108, and 110 are formed from a single piece of sheet metal which is secured at one end to the circular sidewall 58 of the blower housing by a plurality of angle brackets 114.

The front side of the housing 100 is partially closed by a vertical panel 116 which is attached to the outer edge of the top wall 102 and extends vertically above and below to define the upper edge of an enlarged inlet opening on the front side of the housing. The outer end of the housing is formed by a sheet metal end wall 117 having a lower base flange bolted to the outer cross channel 32 of the lower support frame 28. The end wall 117 is formed with an outwardly extending flange 117a along its upper edge (FIG. 1), and the outer end portion of the main rotor shaft 54 is supported for rotation by a third flange-type bearing 52 mounted on the outer surface of the end wall. The shaft 54 projects outwardly of the end wall bearing 52 in order to accommodate a sprocket 118 keyed thereon (FIG. 5) which is drivingly interconnected with a lower sprocket 120 via a roller chain 122. The sprocket 122 is spaced below a horizontal end wall stiffening member 124 spot welded to the outer surface of the end wall, and the sprocket is keyed onto the projecting outer end portion of an auger shaft 126 which drives the auger 101. Accordingly, when rotative power is supplied to turn the rotor assembly 18 through the power take-off assembly 22 and rotor shaft 54, the feed auger 101 is rotated at a somewhat lower speed via the chain 122 and sprockets 118 and 120.

The auger shaft 126 is supported at its outer end portion in cantilever fashion by a flange bearing 128 mounted on the outside surface of the end wall 117, and the auger screw feeds or moves the material in the lower portion of the feeder housing 100 toward the inlet opening 24 on the sidewall 58 of the blower housing 14. As best shown in FIG. 1, the auger 101 projects horizontally toward the inlet opening 24 from the outer end wall 117 of the feeder housing but terminates short of the sidewall 58 to permit direct feeding of material without contact with the auger.

The chain 122 and sprockets 118 and 120 are enclosed and guarded by a removable sheet metal guard 130 which is bolted to the outer surface of the housing end wall 117, as best shown in FIG. 1.

As illustrated in FIGS. 1, 3, and 4, the feeder housing 100 also includes an opposite end panel 132 having a stiffening flange 132a along the upper edge thereof. The panel 132 extends outwardly of the blower sidewall 58 from a line adjacent the outer (right side FIG. 4) edge of the inlet opening 24. The end panel 132 is removably secured to the blower sidewall with a plurality of bolts 134, and the outwardly projecting portion is similar in shape to the oppositely facing outer end portion of the end wall 117. The outwardly extending portions of the panel 132 and end wall 117 are structurally interconnected by a piece of sheet metal 136 (FIGS. 1, 3, and 4) having a vertical flange portion 136a at the upper end, an inwardly and downwardly sloping intermediate wall section 136b, and a lower, horizontal flange portion 136c which rests on and is secured to the upper flange of the side channel 30.

In order to facilitate the delivery material into the path of the auger 101 for feeding into the blower housing 14 through the inlet opening 24, the feeder mechanism 26 includes a shaker pan assembly 140 comprising an inwardly and downwardly sloping movable pan member 142 having a pair of upwardly projecting side flanges 142a at opposite ends disposed to lie closely adjacent the respective end walls 117 and 132 of the housing. The outer edge of the shaker pan 142 is formed with a downturned flange or lip 142b and is supported on the upper edge of the vertical portion 136a of the housing front panel 136.

The inner portion of the shaker pan 142 is disposed to lie above the bottom wall panel 110 of the feeder housing 100 (FIGS. 3 and 4) and directs material downwardly into the path of the rotating auger 101. In order to move the shaker pan, thereby facilitating feeding of material to the auger, the inner end portion is supported by a shaft 144 extending horizontally between the housing end walls 117 and 132 outwardly of the auger. The shaft is spaced below the shaker pan and is supported by flange bearings 146 mounted on the respective end walls 117 and 132. As best shown in FIGS. 3 and 4, the shaft is formed with a plurality of short, upstanding radial arms 144a which are pivotally connected adjacent their outer ends to channel brackets 148 secured on the underside of the shaker pan. Accordingly, as the shaker pan shaft 144 is oscillated or rotated back and forth about is longitudinal axis, the inner end portion of the shaker pan moves up and down and shakes the material loaded thereon so that it moves steadily down the slope of the pan into the auger.

The shaker pan shaft 144 is driven to oscillate by means of a crank lever 150 (FIG. 1) mounted on the outer end thereof and the crank lever is pivotally connected to the outer end of a pusher arm 152 having its inner end pivotally connected to the sprocket 120 eccentric of the axis of rotation. Accordingly, as the shaft 120 rotates continuously in one direction, the shaker pan shaft 144 oscillates back and forth to shake the pan 142.

From the foregoing description, it will be seen that material dumped into the open front side of the feeder mechanism 26 on the shaker pan 142 is fed downwardly toward the V-shaped botom panels of the housing 100 where the rotating auger 101 then moves the material in a generally horizontal direction toward the large inlet opening 24 in one side of the blower housing. The moving blades 96 of the rotor assembly 18 pick up the material entering the blower housing and discharge it at high velocity through the discharge boot 20.

In order to supply a little excess air to aid in the pneumatic conveyance of the material around the housing and out the discharge boot 20 into the delivery pipe connected therewith, the forward sidewall 56 is provided with a plurality of small air holes 56a (FIGS. 2 and 3) which are clustered in an area diametrically opposite the inlet opening 24 with respect to the main rotor shaft 54. The air passing through the holes 56a helps to prevent material buildup on the forward sidewall 56 and reduces the running friction on the rotor assembly caused by material lodged between the edges of the rotor blades 96 and the inside surface of the sidewall.

Referring now to the embodiment of FIGS. 7 and 8, this unit includes an elongated, drag-type conveyor 160 for delivering material to the auger 101, rather than a shaker pan, but in all other respects is similar to the embodiment previously described. The conveyor 160 includes a pair of endless chains 162 which are driven by a pair of drive sprockets 164 disposed on a shaft 166 extending parallel to and outward of the auger shaft 126. The shaft 166 is driven by a sprocket 168 mounted on the auger shaft outwardly of the sprocket 120 and drivingly connected with a sprocket 170 carried on the conveyor shaft via a drive chain 172. The chain 172 passes over a first idler sprocket 173, around a second idler sprocket 175 spaced outwardly of the shaft 166, and engages the upper portion of the sprocket 170 driving it in a counterclockwise direction as shown. The forward or discharge end of the conveyor 160 is adapted to deliver material as indicated by the arrow B (FIG. 8) onto the bottom panels 108 and 110 of the housing, where it is engaged by the rotating auger 101 and moved toward the blower housing inlet 24.

The chains 162 are adapted to run in channel members 176 extending along opposite sides of the conveyor and a bottom wall or pan 178 is provided between the channels to support the material as it is advanced by the conveyor. The conveyor chains are interconnected by angular drag members or pushers 180 having upstanding flanges which engage and force the material toward the auger 101.

In order to help contain material delivered or dumped onto the conveyor from a wagon or truck, there is provided a pair of upwardly and outwardly extending sidewalls 182 having horizontal, flanged, outer edge portions 182a. The lower edges of the walls 182 are secured to the outer flanges of the side channels 176 by a plurality of bolts 184, and the sidewalls thus provide a wide area for receiving forage material dumped from a truck or wagon.

The conveyor 160 is pivotally supported at its inner or discharging end by the shaft 166 and is pivotal thereon into an upright position (not shown) when the unit is not in use and is to be transported from place to place. The outer end of the conveyor is provided with a suitable jack assembly (not shown) for supporting the conveyor when in the inwardly and downwardly sloping position, as shown, when the conveyor is in operation.

By the addition of the conveyor 160, the dumping of bulk quantities of material from large wagons or trucks and the like is facilitated because of the enlarged area provided by the bottom wall 178 and outwardly sloping sidewalls 182 which combine to form a large holding trough for the material.

From the foregoing, it can be seen that the blower type silo filler 10 of the present invention includes many advantageous features, such as the novel rotor assembly and blower construction and the adjustable shear knife assembly and feeder mechanisms, and it is intended in the appended claims to cover all those modifications occurring to those skilled in the art which fall within the spirit and scope of the invention.

What is claimed and desired to be secured by Letters Patent of the United States is:

1. A centrifugal blower for the pneumatic conveyance of particulate materials comprising a blower housing having first and second spaced apart sidewalls; a rotor assembly mounted for rotation in said housing about an axis normal to said sidewalls; means forming an inlet for material in said first sidewall; said rotor assembly including a hub, a plurality of spokes extending radially outwardly of said hub, and a rotor blade replaceably mounted adjacent the outer end of each spoke; outlet means between said sidewalls for directing discharged material outwardly of said housing tangentially of the path of said rotor blades; each of said spokes having a channel-shaped transverse cross section including a blade supporting web normal to said sidewalls and first and second depending stiffening flanges along opposite edges of said web in facing parallel relation with said first and second sidewalls, respectively; said second flange having a depth normal to said web tapered from a maximum at said hub to a minimum at the outer end, said first flange having a depth substantially less than said maximum depth of said second flange; each of said blades being trough shaped with an arcuately curved transverse cross section for receiving material and including opposite longitudinal side edges spaced in advance of the web of a supporting spoke in the direction of rotation of said blade.

2. The blower of claim 1 wherein said first flanges are substantially equal in depth to the minimum depth of said second flanges and are substantially uniform in depth from said hub to the outer end thereof.

3. The blower of claim 1 wherein said second flanges have inner end surfaces in juxtaposition to the webs of adjacent spokes.

4. The blower of claim 1 including an adjustable shear knife assembly mounted adjacent a throat portion of said outlet means, said shear knife assembly including an angle support having a first flange extending radially outward of said housing and adjustably mounted on said outlet means for radial movement toward and away from said rotor hub, and a second flange generally tangent to the path of said rotor blades, and a plurality of triangular shaped knives replaceably mounted on said second flange, said knives having V-shaped cutting edges for shearing and chopping material carried around said housing and extending beyond the outer ends of said rotor blades.

References Cited
UNITED STATES PATENTS

| | | | |
|---|---|---|---|
| 2,239,913 | 4/1941 | Hall | 302—37 |
| 2,405,695 | 8/1946 | Hitchcock et al. | 307—37 |
| 2,466,210 | 4/1949 | Creager | 302—37 |
| 2,739,846 | 3/1956 | Jacobsen | 302—37 |
| 3,050,341 | 8/1962 | Whitney | 302—37 |
| 3,314,596 | 4/1967 | Burinsky et al. | 302—37 |

ANDRES H. NIELSEN, Primary Examiner

PO-1050
(5/69)

UNITED STATES PATENT OFFICE
CERTIFICATE OF CORRECTION

Patent No. 3,466,095      Dated September 9, 1969

Inventor(s) Walter N. Weihmuller

It is certified that error appears in the above-identified patent and that said Letters Patent are hereby corrected as shown below:

Column 9, line 41, cancel "first" and insert --second-- therefor.

SIGNED AND
SEALED
MAY 19 1970

(SEAL)
Attest:

Edward M. Fletcher, Jr.
Attesting Officer

WILLIAM E. SCHUYLER, JR.
Commissioner of Patents